United States Patent [19]

Yoshida

[11] Patent Number: 4,498,149

[45] Date of Patent: Feb. 5, 1985

[54] SYMBOL INPUT DEVICE FOR USE IN ELECTRONIC TRANSLATOR

[75] Inventor: Kunio Yoshida, Nara, Japan

[73] Assignee: Sharp Kabushiki Kaisha, Osaka, Japan

[21] Appl. No.: 521,414

[22] Filed: Aug. 8, 1983

Related U.S. Application Data

[63] Continuation of Ser. No. 201,604, Oct. 28, 1980, abandoned.

[30] Foreign Application Priority Data

Oct. 29, 1979 [JP] Japan .................. 54-140196

[51] Int. Cl.³ .............................. G06F 3/02
[52] U.S. Cl. .................... 364/900; 364/709
[58] Field of Search ... 364/200 MS File, 900 MS File, 364/709

[56] References Cited

U.S. PATENT DOCUMENTS

| | | | |
|---|---|---|---|
| 3,715,746 | 2/1973 | Hatano | 340/365 S |
| 3,892,958 | 7/1975 | Tung | 235/145 R X |
| 3,938,099 | 2/1976 | Hyder | 364/900 |
| 4,020,467 | 4/1977 | Hashimoto et al. | |
| 4,099,246 | 7/1978 | Osborne | 364/709 |
| 4,130,882 | 12/1978 | Swanstrom et al. | 364/900 |
| 4,158,236 | 6/1979 | Levy | 364/900 |
| 4,176,974 | 12/1979 | Bishai et al. | 364/900 X |
| 4,270,022 | 5/1981 | Loh | 340/365 R |

FOREIGN PATENT DOCUMENTS 1435265  5/1976  United Kingdom.

*Primary Examiner*—Raulfe B. Zache
*Assistant Examiner*—David Y. Eng
*Attorney, Agent, or Firm*—Birch, Stewart, Kolasch & Birch

[57] ABSTRACT

An input circuit adapted to be connected to an electronic translator is disclosed. The input circuit comprises an alphabetical keyboard for inputting key code information representative of letters in an input word and a single symbol additive key switch for adding any one of several specific symbols to at least one of the letters. The specific symbol represents, for example, an inflection and is needed to completely represent the input word. A circuit for changing the coded input representing the at least one letter by adding thereto coded input representing the specific symbol is provided.

7 Claims, 3 Drawing Figures

SYMBOL INPUT DEVICE FOR USE IN ELECTRONIC TRANSLATOR

This application is a continuation of application Ser. No. 201,604 filed on Oct. 28, 1980, now abandoned.

BACKGROUND OF THE INVENTION

The present invention relates to an electronic translator and, more particularly, to an electronic circuit for such an electronic translator for effectively entering words.

Recently, a new type of electronic device called an electronic translator has been available on the market. The electronic translator differs from conventional types of electronic devices in that it is of a unique structure which provides for efficient and rapid retrieval of word information stored in a memory. An example of such an electronic translator was disclosed in Levy U.S. Pat. No. 4,158,236, June 12, 1979, entitled "Electronic Dictionary and Language Interpreter".

A conventional electronic translator has memory modules for translating English into, for example, Spanish, French, Italian, German, Portugese and Japanese, and vice versa. Words of many languages are spelled in Roman alphabet while Japanese and Chinese characters are used in those languages. Chinese and Japanese words, like those spelled in Roman letters, can be alphabetized.

In some of these languages, there are specific symbols such as umlaut in German, "cédille: Ç" and "tréma: ··" in French, and "tilde: ~" in Spanish, which are added to words to provide specific senses.

When a word with such a specific symbol is to be entered into a conventional translator, it generally requires that an input device have a specific key switch directed to such a specific symbol in a conventional input device which comprises a keyboard having a plurality of key switches. The result is an increased size in the input device and complex operation of the device.

Therefore, it is desired to facilitate the input of words with specific symbols peculiar to each of several languages to an electronic translator, in particular, to a multilingual translator with simplified the input means.

SUMMARY OF THE INVENTION

Accordingly, it is an object of the present invention to provide an improved electronic translator.

It is a further object of the present invention to provide an improved input device for use in an electronic translator for facilitating the input of words of languages requiring the addition of a specific symbol or symbols to words.

It is a further object of the present invention to provide an improved input device comprising a plurality of alphabetical key switches and a single switch which is actuated to add specific different symbols to words dependent on the language, the single switch being actuated commonly in the case of different languages.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a novel input circuit is connected to an electronic translator which itself comprises means for developing a second word represented in a second language equivalent to a first word represented in a first language. The input circuit comprises an alphabetical keyboard for providing key code information representative of letters in the first word, a symbol additive key switch for adding a specific symbol to at least one of the letters, the specific symbol being needed to completely represent the first word, and a changing circuit for changing the letters to complete the first word by adding the specific symbol to at least one of the letters.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Any language can be applied to an electronic translator of the present invention. An input word is spelled in a specific language to obtain an equivalent word or a translated word spelled in a different language corresponding thereto. The languages can be freely selected. According to an embodimemt of the present invention, it is assumed that the input languages are each of German, French and Spanish.

Further, it is supposed in this embodiment that no distinction is made between capital letters and small letters and all the words are entered in the form of capital letters.

One of the features of the present invention relates to the fact that letters in various languages may include a specific symbol as described below, various symbols being peculiar to each language. Examples of letters and related specific symbols are as follows:

(1) "umlaut" in German: A, O and U
(2) "cédille" in French: C
(3) "tréma" in French: E, I and U
(4) "tilde" in Spanish: N Although these items are different from each other in the name and the usage, according to the present invention, they can be treated as the same symbol in the input and output.

Figure 1:
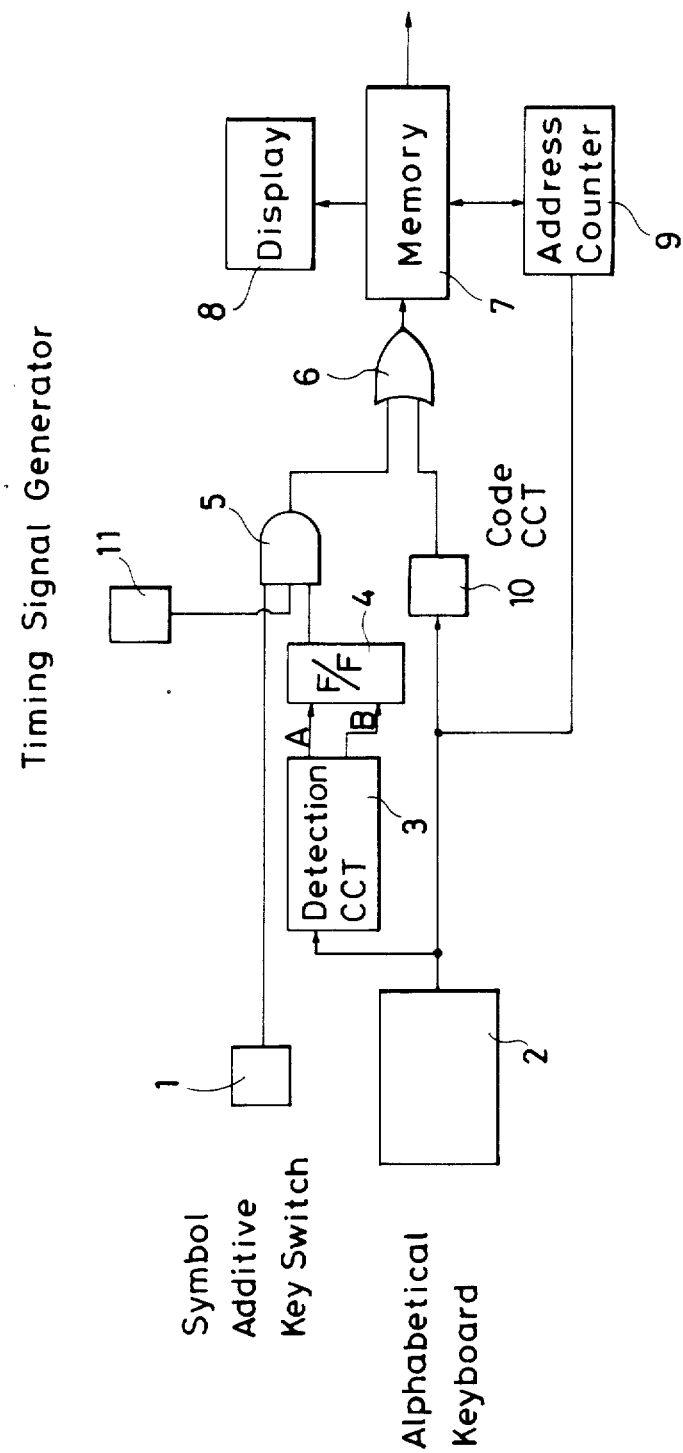
FIG. 1 shows a block diagram of an input circuit for use with an electronic translator according to the present invention.

Referring now to FIG. 1, there is shown a block diagram of an input circuit according to the present invention, connected to an electronic translator. The input circuit comprises a symbol additive key switch 1, an alphabetical keyboard 2, a detection circuit 3, a flip flop 4, an AND gate 5, an OR gate 6, a memory 7, a display 8, an address counter 9, a code circuit 10, and a timing generator 11.

More particularly, the key switch 1 consists of a single key switch which is actuated to add each of the above described specific symbols in various languages to appropriate letter contained in words. The alphabetical keyboard 2 contains 26 alphabetical key switches each actuated to enter a letter, additional key switches each actuated to enter additional marks such as the comma, the period, and the brackets, excluding the above described specific symbols, and other functional key switches such as a mode selector key switch.

The detection circuit 3 serves to detect each of seven letters "A", "O", "U", "C", "E", "I" and "N" as described above in items (1) through (4) in German, French and Spanish, when entered into the electronic translator. When the circuit 3 detects one of the seven letters, it develops A signals which are provided to the flip flop 4. Otherwise, circuit 3 provides B signals to the flip flop 4.

The flip flop 4 is turned set in response to the A signals and reset in response to the B signals. The memory 7 receives an input word entered by the keyboard 2, through the OR gate 6. The address counter 9 is provided for addressing the memory 7. The code circuit 10 is provided for encoding key input signals entered by the keyboard into key code information. The timing signal generator 11 is provided for developing timing signals in the case of the leading bit in a logical level "1" to provide a word with one of the above described specific symbols.

In case where one of the alphabetical key switches in the keyboard 2 is actuated, particular key input signals are generated which are changed to a particular type of key code information by the code circuit 10. At the same time, the address of the address counter 9 improves by one in response to the particular key input signals entered. The address of the memory 7 accordingly improves by one whereat the particular type of key code information is stored.

If an entered letter is different from one of the above seven letters, the entered letter is simply transferred to the memory 7 since the flip flop 4 is placed in the reset condition and the AND gate 5 is kept unconductive. If the entered letter is one of the above seven letters, it is transferred to the memory 7 and the flip flop 4 is turned set whereby the AND gate 5 may become conductive. When it is desired to add a symbol to one of the above seven letters, the key switch 1 is actuated so that the AND gate 5 becomes conductive to thereby apply the timing signals from the generator 11 to the memory through the AND gate 5 and the OR gate 6.

The address of the memory 7 remains unchanged after it is improved in response to the actuation of one letter key switch of the keyboard 2. The timing signals are thus entered into that location in the memory 7 so that a new type of code information is formed by combining the particular type of letter key code information and the timing signals. For example, the timing signals, say, "1" replace the leading bit, say, "0" of the particular combined key code information. The new type of code information represents one letter with one of the specific symbols. A correlation between code information of the 26 letters and that of the seven letters with the specific symbols is illustrated in the following Table I:

TABLE I

|   | code |   |   |   |   |   |   | code |   |   |   |   |   |
|---|---|---|---|---|---|---|---|---|---|---|---|---|---|
| A | 0 | 0 | 0 | 0 | 0 | 1 | Ä | 1 | 0 | 0 | 0 | 0 | 1 |
| B | 0 | 0 | 0 | 0 | 1 | 0 |   |   |   |   |   |   |   |
| C | 0 | 0 | 0 | 0 | 1 | 1 | Ç | 1 | 0 | 0 | 0 | 1 | 1 |
| D | 0 | 0 | 0 | 1 | 0 | 0 |   |   |   |   |   |   |   |
| E | 0 | 0 | 0 | 1 | 0 | 1 | É | 1 | 0 | 0 | 1 | 0 | 1 |
| F | 0 | 0 | 0 | 1 | 1 | 0 |   |   |   |   |   |   |   |
| G | 0 | 0 | 0 | 1 | 1 | 1 |   |   |   |   |   |   |   |

TABLE I-continued

|   | code |   |   |   |   |   |   | code |   |   |   |   |   |
|---|---|---|---|---|---|---|---|---|---|---|---|---|---|
| H | 0 | 0 | 1 | 0 | 0 | 0 |   |   |   |   |   |   |   |
| I | 0 | 0 | 1 | 0 | 0 | 1 | Ï | 1 | 0 | 1 | 0 | 0 | 1 |
| J | 0 | 0 | 1 | 0 | 1 | 0 |   |   |   |   |   |   |   |
| K | 0 | 0 | 1 | 0 | 1 | 1 |   |   |   |   |   |   |   |
| L | 0 | 0 | 1 | 1 | 0 | 0 |   |   |   |   |   |   |   |
| M | 0 | 0 | 1 | 1 | 0 | 1 |   |   |   |   |   |   |   |
| N | 0 | 0 | 1 | 1 | 1 | 0 | Ñ | 1 | 0 | 1 | 1 | 1 | 0 |
| O | 0 | 0 | 1 | 1 | 1 | 1 | Ö | 1 | 0 | 1 | 1 | 1 | 1 |
| P | 0 | 1 | 0 | 0 | 0 | 0 |   |   |   |   |   |   |   |
| Q | 0 | 1 | 0 | 0 | 0 | 1 |   |   |   |   |   |   |   |
| R | 0 | 1 | 0 | 0 | 1 | 0 |   |   |   |   |   |   |   |
| S | 0 | 1 | 0 | 0 | 1 | 1 |   |   |   |   |   |   |   |
| T | 0 | 1 | 0 | 1 | 0 | 0 |   |   |   |   |   |   |   |
| U | 0 | 1 | 0 | 1 | 0 | 1 | Ü | 1 | 1 | 0 | 1 | 0 | 1 |
| V | 0 | 1 | 0 | 1 | 1 | 0 |   |   |   |   |   |   |   |
| W | 0 | 1 | 0 | 1 | 1 | 1 |   |   |   |   |   |   |   |
| X | 0 | 1 | 1 | 0 | 0 | 0 |   |   |   |   |   |   |   |
| Y | 0 | 1 | 1 | 0 | 0 | 1 |   |   |   |   |   |   |   |
| Z | 0 | 1 | 1 | 0 | 1 | 0 |   |   |   |   |   |   |   |

Figure 2:
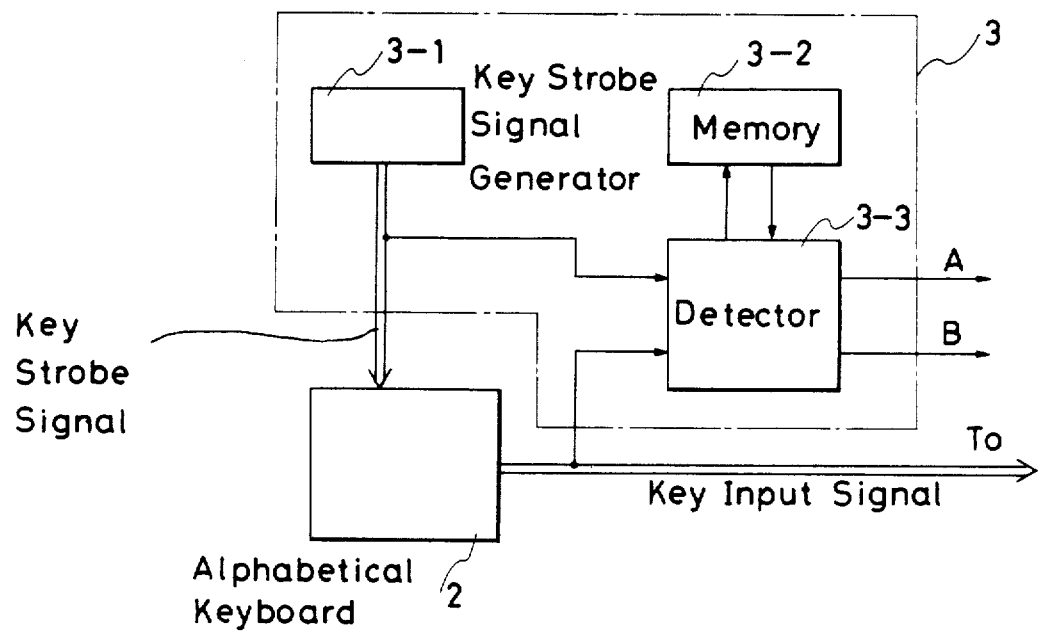
FIG. 2 shows a block diagram of a detection circuit connected in the circuit of FIG. 1.

FIG. 2 shows a block diagram of the detection circuit 3. The circuit 3 comprises a key strobe signal generator 3-1, a memory 3-2, and a detector 3-3.

The generator 3-1 develops and provides key strobe signals to the keyboard 2 which conditions the strobe signal in accordance with the particular letter key actuated, thus generating key input signals. The detector 3-3 is coupled to each of the generator 3-1 and the keyboard 2 for receiving each of the key strobe signals and the key input signals. The detector 3-3 functions to detect whether one of the above seven letter keys is actuated.

The memory 3-2 stores data representing a predetermined relation between each respective key strobe signal corresponding to the above seven letters, and each respective key input signal. The detector 3-3 detects the input of one of the above seven letters by comparing each of the key strobe signals with its key input signal. If such comparison indicates a relationship equivalent to one of those in memory 3-2, the detector 3-3 develops the A signals. If not, it develops the B signals.

Figure 3:
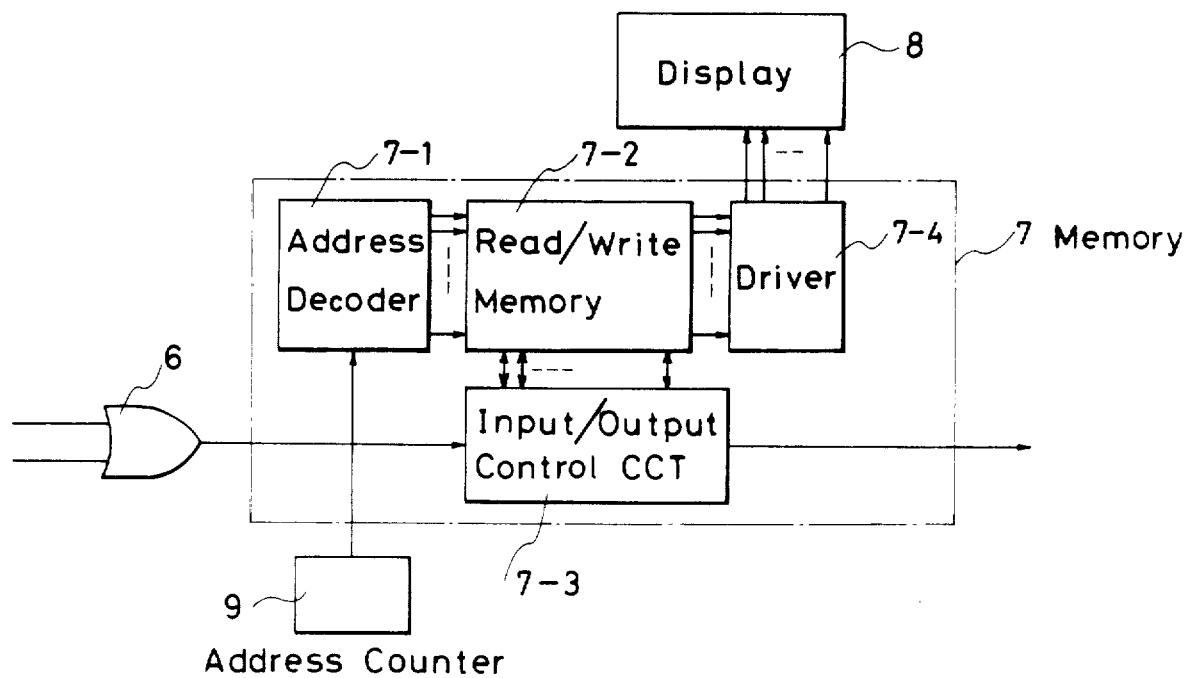
FIG. 3 shows a block diagram of a memory circuit connected in the circuit of FIG. 1.

FIG. 3 shows a block diagram of the memory 7 where there are provided an address decoder 7-1, a read/write memory 7-2, an input/output control circuit 7-3, and a driver 7-4.

The address decoder 9 is coupled to the address counter 7-1 so that the address of the address counter 9 is applied to the decoder 7-1. Responsive to the address in the decoder 7-1, the memory 7-2 is addressed whereat it is adapted to store each letter at the address. Each letter is introduced into the memory 7-2 through the control circuit 7-3 since the circuit 7-3 receives each letter from the OR gate. The timing signals are introduced to the control circuit 7-3 through the OR gate 6 to thereby enter to the memory 7-2. The memory 7-2 serves to combine the proper letter codes and the timing signals to make the new type of code information as listed in Table I. The new type of code information is outputted to each of the driver 7-4 and the circuit 7-3.

The control circuit 7-3 also receives letters other than the above seven letters. Such letters are applied to the driver 7-4 through the memory 7-2, also.

The driver 7-4 changes the applied code information to character codes so that the display 8 may show each letter including the above seven letters in addition to the remaining letters. The control circuit 7-3 transmits the code information received from OR gate 6 to the remaining circuitry (not shown) of the electronic translator.

Typically, the above-mentioned remaining circuitry of the electronic translator comprises additional memory means for storing a plurality of first words and corresponding translated words, address means for addressing the additional memory means, and detection means for comparing an input word and each of the first words developed by the memory means to detect one of the first words corresponding to the input word, as disclosed in Levy U.S. Pat. No. 4,158,236. The control circuit 7-3 provides the code information to the address means.

While only certain embodiments of the present invention have been described, it will be apparent to those skilled in the art that various changes and modifications may be made therein without departing from the spirit and scope of the invention as claimed.

What is claimed is:

1. An input circuit for an electronic translator wherein a first input word represented in a first language is entered to obtain a second word represented in a second language equivalent to the first word, said input circuit comprising:

an alphabetical keyboard means comprising a plurality of letter keys, each letter key comprising means for entering key code information representative of a sole letter;

a sole symbol additive key switch for adding any one of a plurality of different specific symbols to at least two of the letters entered by the alphabetical keyboard means, and changing means responsive to actuation of the alphabetical keyboard means and the symbol additive key switch for changing the key code of any one of the at least two letters entered by the alphabetical keyboard means to a key code representing a letter including one of said specified different symbols and said one letter, wherein said changing means comprises key strobe signal generator means for providing key strobe signals to the alphabetical keyboard means, said keyboard means acting upon said key strobe signals to provide said key code information;

memory means for storing data corresponding to key code information representing said at least two letters;

first means for determining when key code information input by said alphabetical keyboard means is the same as said data in said memory corresponding to said key code information representing one of said at least two letters;

second means for generating information representative of any one of said plurality of different specific symbols in response to actuation of said sole symbol additive key switch; and third means responsive to said first and second means for combining said information representative of any one of said plurality of different specific symbols with the key code information representing said one of said at least two letters for forming a new type of code information representative of said one letter including one of said specific symbols.

2. The circuit according to claim 1, wherein said sole symbol additive key switch is adapted to be actuated subsequent to actuation of the alphabetical keyboard means for adding a symbol to said one of said at least two letters entered by the alphabetical keyboard means.

3. The circuit according to claim 1, further comprising display means connected to the changing means for displaying the complete first word including letters entered by said alphabetical keyboard means and symbols added by said symbol additive key switch.

4. The circuit according to claim 1, further comprising additional memory means coupled to an address counter means which is responsive to actuation of said alphabetical keyboard means for providing address information to said additional memory means, whereby said additional memory means stores each letter input by said alphabetical keyboard means in order.

5. The circuit according to claim 1, wherein the first language is selected from the group consisting of German, French and Spanish.

6. The circuit according to claim 5, wherein the specific symbol is selected from the group consisting of "umlaut" in German, "cédille" in French, "tréma" in French and "tilde" in Spanish.

7. The circuit as in claim 1, wherein said alphabetical keyboard means comprises a plurality of keys for entering key code information representing a plurality of letters and said at least two letters comprise less than all of said plurality of letters.

* * * * *